F. C. D. McKAY.
Pulley-Blocks.

No. 149,941.

Patented April 21, 1874.

Witnesses.
H. L. Perrine,
A. H. Norris.

Inventor.
F. C. D. McKay.
Per James L. Norris,
Atty.

of the page.

UNITED STATES PATENT OFFICE.

FERDINAND C. D. McKAY, OF ELMIRA, NEW YORK.

IMPROVEMENT IN PULLEY-BLOCKS.

Specification forming part of Letters Patent No. 149,941, dated April 21, 1874; application filed September 30, 1873.

CASE B.

*To all whom it may concern:*

Be it known that I, FERDINAND C. D. MC-KAY, of Elmira, New York, have invented an Improvement in Pulley-Blocks for Operating Doors, and for other purposes, of which the following is a specification:

This invention relates to certain improvements in pulley-blocks specially designed for closing doors, and for holding them more or less open, when desired, although it is evident that it may be employed in various positions and for many purposes. The invention consists of a pulley having a slot or opening mounted on its axis in such a manner that the distance from its circumference, with respect to said axis, may be changed, in order to procure a greater or less eccentric arrangement of said pulley, as will be hereinafter described.

Figure 1:
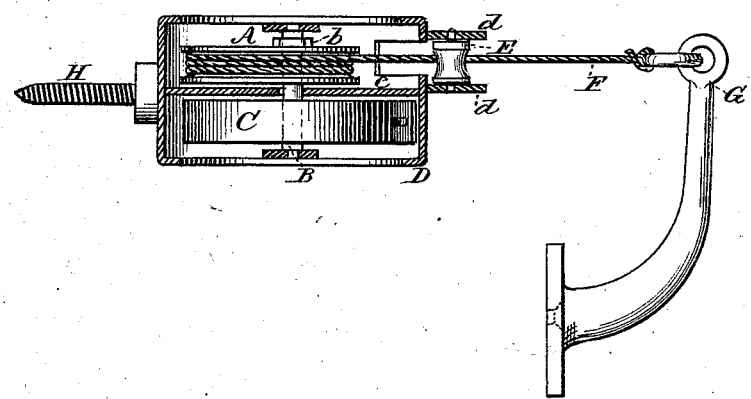
Figure 2:
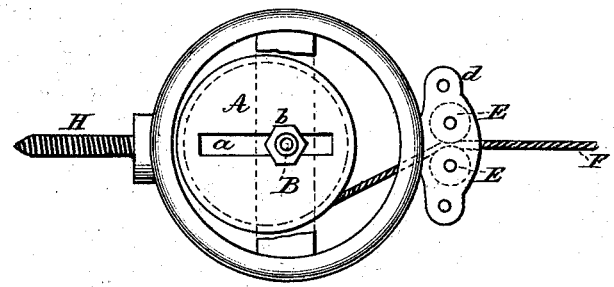
Figure 3:
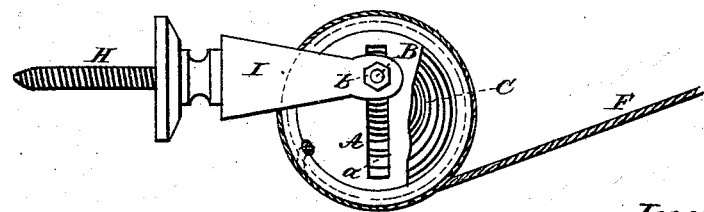

In the drawing, Figure 1 is a view, partly in section, of my pulley applied to a casing for operating a door or other object. Fig. 2 is a side view of the same; and Fig. 3, a modification thereof.

The letter A represents a pulley having, preferably, a slot or opening, $a$, cut diametrically through it, and in this slot is arranged the rod or bolt B, which forms the axis or fulcrum of the pulley. The pulley A is, by preference, secured in position on the axis by a nut, $b$, the object of such being that the distance from the circumference of the pulley, with respect to its axis or fulcrum, may be changed, in order to increase or diminish its eccentric arrangement.

The principal feature of this arrangement is that a spring or weight much lighter than the object to be balanced may be employed, the degree of the eccentric arrangement of the pulley depending upon the weight of the object to be balanced, as the heavier the object and the lighter the counter-balance the greater must be the degree of eccentricity.

In order to adapt the pulley as a device for closing doors, or for holding them open at any desired position, I secure one end of a coiled spring, C, to the axis B, and attach its other end to an outer casing, D, which latter may be divided into two parts by a division-plate, $c$, the spring being arranged on one side of the division-plate and the pulley on the other. One side of said casing is provided with ears or flanges $d\ d$, in which are journaled two small rollers, E E, for the purpose of adapting the device to doors opening right or left. One end of a cord or chain, F, is attached to the pulley A, and is passed around the same several times, and its free end is connected to one end of an arm, G, attached to the door or wall, as the case may be. The rear side of the case D is provided, in the present instance, with a screw-threaded shank, H, for attaching the device to the door, or to the wall, by the employment of which I am not required to use special tools to apply the same; but I do not design to apply the device in this manner at all times, as the means of doing so are various. In some instances I make the pulley A hollow, and place the spring C within it, and support the axial bearing of the pulley in a bracket, I, having a screw-threaded shank, as shown.

Instead of employing a spring to counterbalance the object, I design to use a cord or chain and a weight or weights, and accomplish by this means the result obtained by the use of a spring.

By means of the pulley capable of being changed on its axis, and arranged eccentrically, there is one dead-point occurring at each revolution of the same; and hence, when the door is opened, and the pulley comes to this point in respect to the door, the latter will remain in a fixed or stationary position, due to the fact that there is not sufficient force in the counter-balance, be it a weight or spring, to overcome the resistance exerted on the pulley by the door. If an oval-shaped pulley is employed, there will be two dead-points, each occurring when the pulley is in a horizontal plane; and in a many-sided pulley the number of dead-points will be correspondingly increased. Instead of the pulley being formed with a diametrical slot, so as to be mounted on its axis, various other formed slots or openings may be resorted to to accomplish the result desired, viz: To so connect the pulley with its axis that the location of its axial bearing may be changed, with respect to its circumference, to secure a greater or less eccentric arrangement for the object described.

It is evident that the pulley and counterbalance may be used in elevators, dumb-waiters, chandeliers, &c.

I claim—

A pulley-block constructed with an elongated slot, and adjustably connected with its axis, so that the distance from its circumference to its axis or fulcrum can be changed to regulate its eccentricity, said pulley adapted to operate in connection with a spring or weight and cord or chain, substantially as described.

In testimony that I claim the foregoing I have hereunto set my hand this 13th day of September, 1873.

F. C. D. McKAY.

Witnesses:
 JAMES L. NORRIS,
 A. H. NORRIS.